United States Patent [19]

Logan et al.

[11] 4,253,730

[45] Mar. 3, 1981

[54] OPTICAL FIBER CONNECTOR

[75] Inventors: Maurus C. Logan, Elizabeth, N.J.;
John M. Cole, New Hope, Pa.; Peter Garner, Chatham, N.J.

[73] Assignee: Thomas & Betts Corporation, Raritan, N.J.

[21] Appl. No.: 852,229

[22] Filed: Nov. 17, 1977

Related U.S. Application Data

[63] Continuation-in-part of Ser. No. 753,423, Dec. 22, 1976, abandoned.

[51] Int. Cl.³ .............................................. G02B 5/14
[52] U.S. Cl. .................................................. 350/96.21
[58] Field of Search ................ 350/96.20, 96.21, 96.22

[56] References Cited

U.S. PATENT DOCUMENTS

| | | | |
|---|---|---|---|
| 3,917,383 | 11/1975 | Cook | 350/96.21 |
| 4,050,783 | 9/1977 | Tardy | 350/96.21 |
| 4,111,522 | 9/1978 | Auracher | 350/96.21 |

FOREIGN PATENT DOCUMENTS

| | | | |
|---|---|---|---|
| 2345273 | 3/1974 | Fed. Rep. of Germany | 350/96.21 |
| 2363986 | 7/1975 | Fed. Rep. of Germany | 350/96.21 |
| 2291510 | 6/1976 | France | 350/96.21 |

*Primary Examiner*—Stewart J. Levy
*Attorney, Agent, or Firm*—James J. Daley; Robert M. Rodrick; Jesse Woldman

[57] ABSTRACT

The invention is directed to a connector for optically coupling one or more fibers to a like number of fibers. The individual fibers are supported upon members having resilient supports to permit the fibers on one member to be positioned onto the support of the other member and provide support during the complete coupling operation. Various clamps and strain reliefs are provided to minimize the effects of forces upon the cable or individual fibers. The cable may take a flat, circular or other configuration and the fibers may be of glass or plastic and may be coated with reflective sheaths or the like.

7 Claims, 44 Drawing Figures

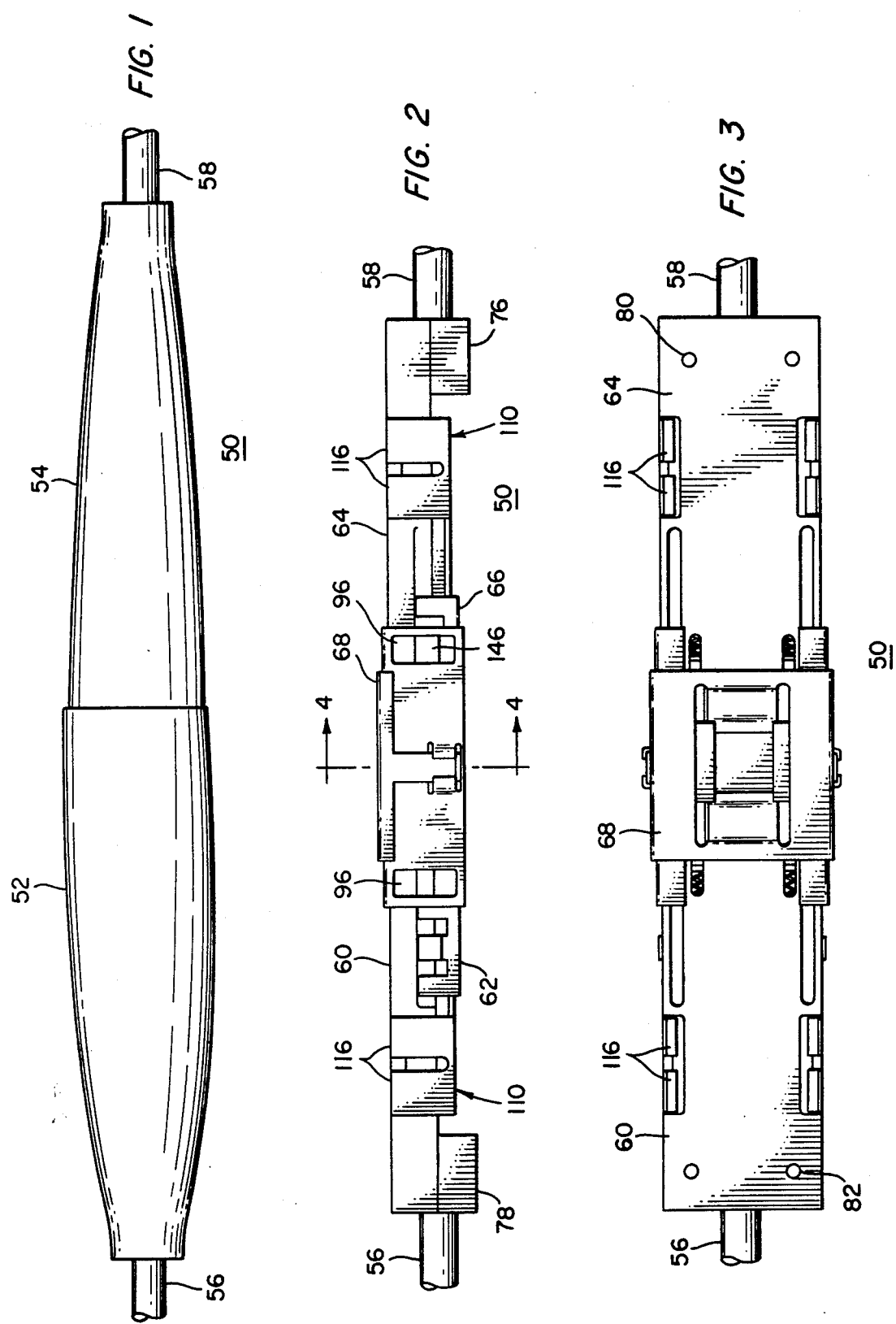

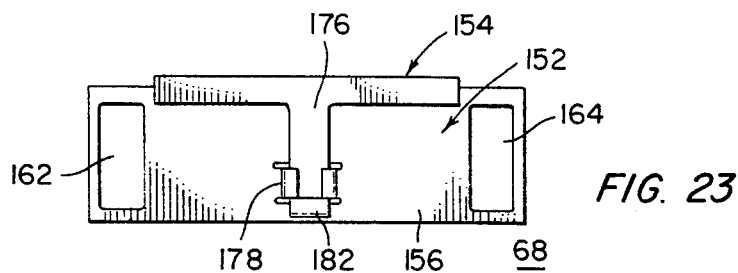
FIG. 23
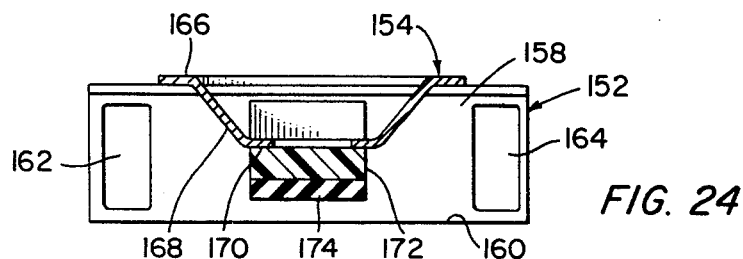
FIG. 24
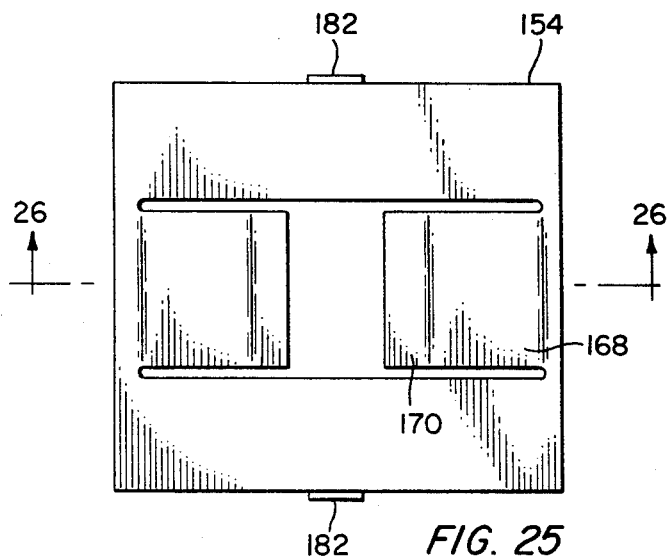
FIG. 25
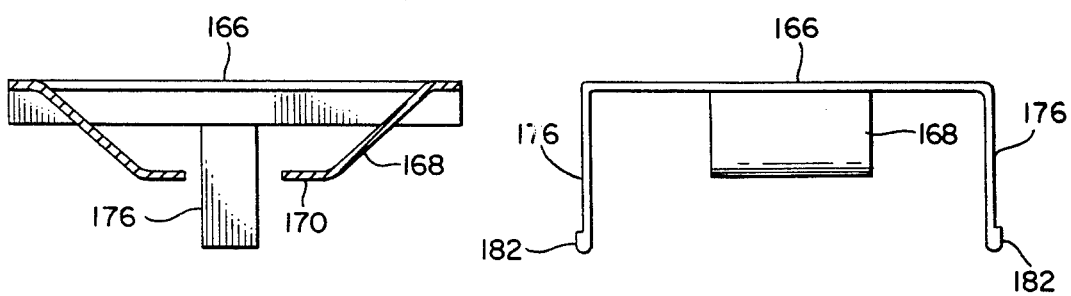
FIG. 26
FIG. 27

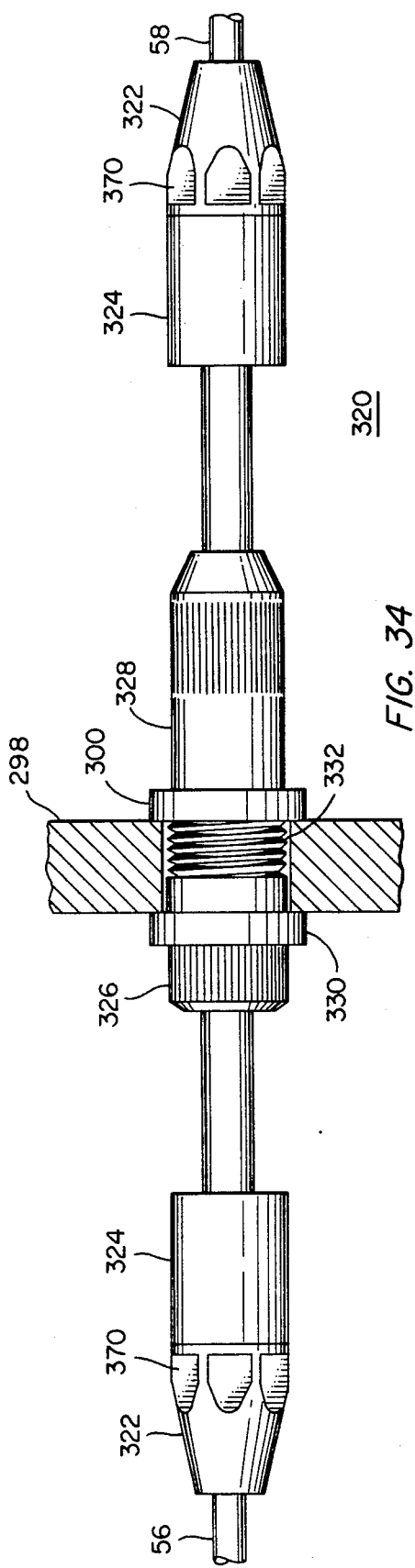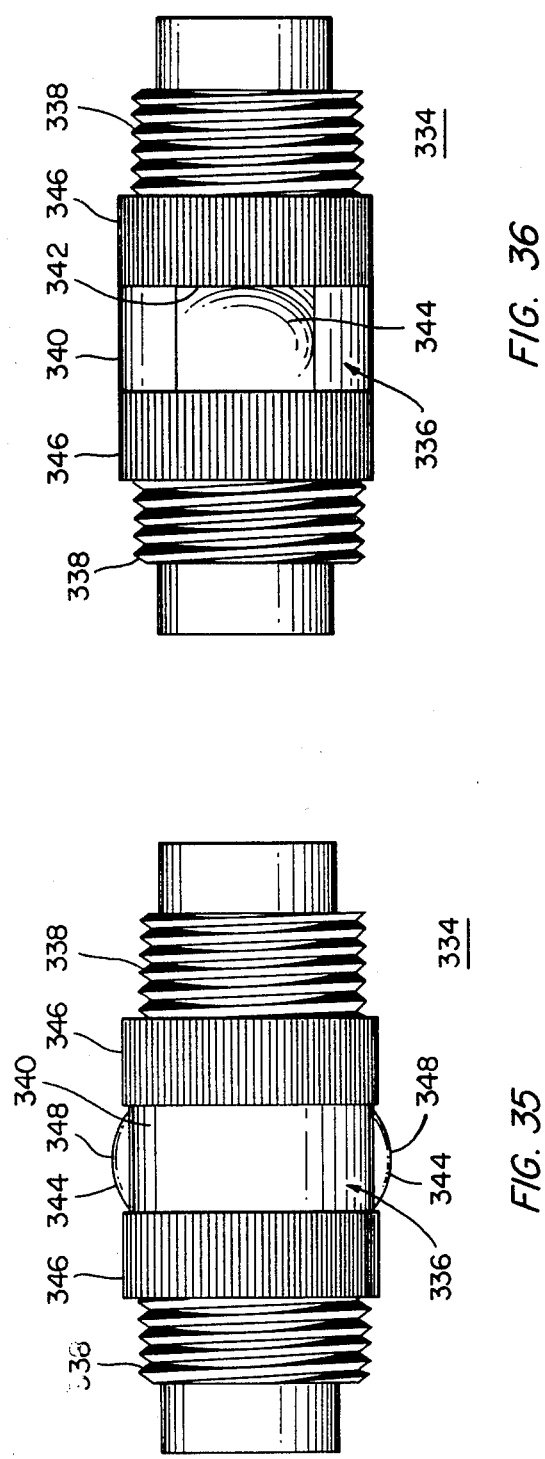
FIG. 34
FIG. 36
FIG. 35

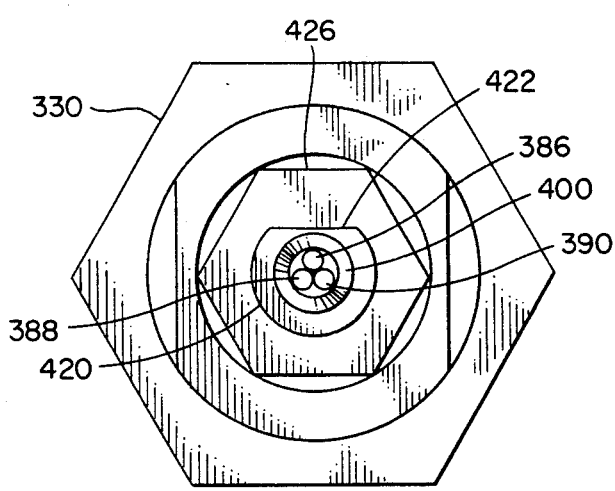
FIG. 38
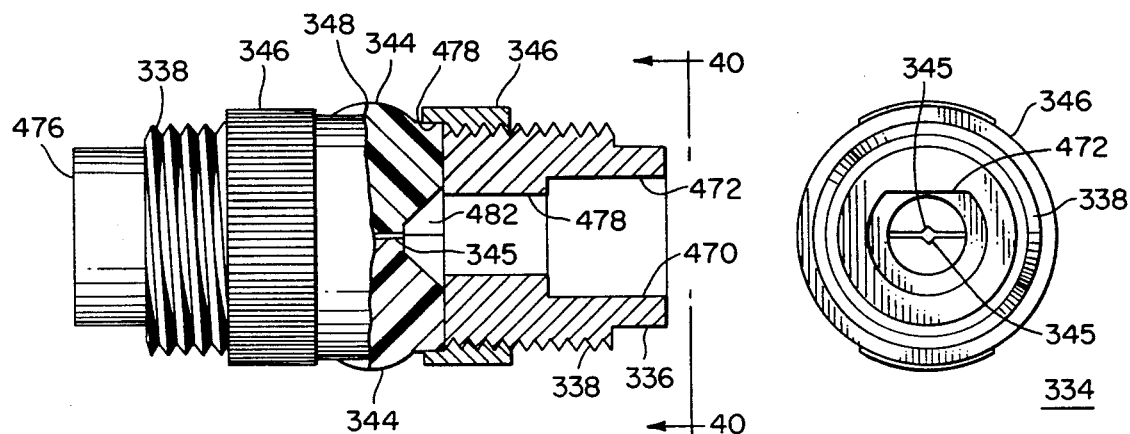
FIG. 39
FIG. 40
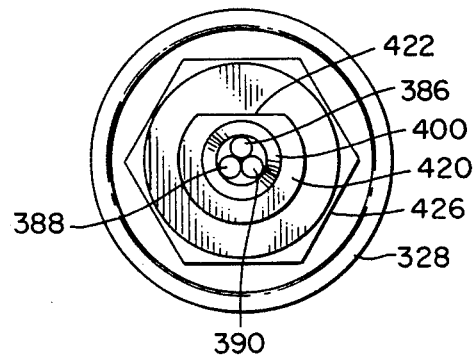
FIG. 42

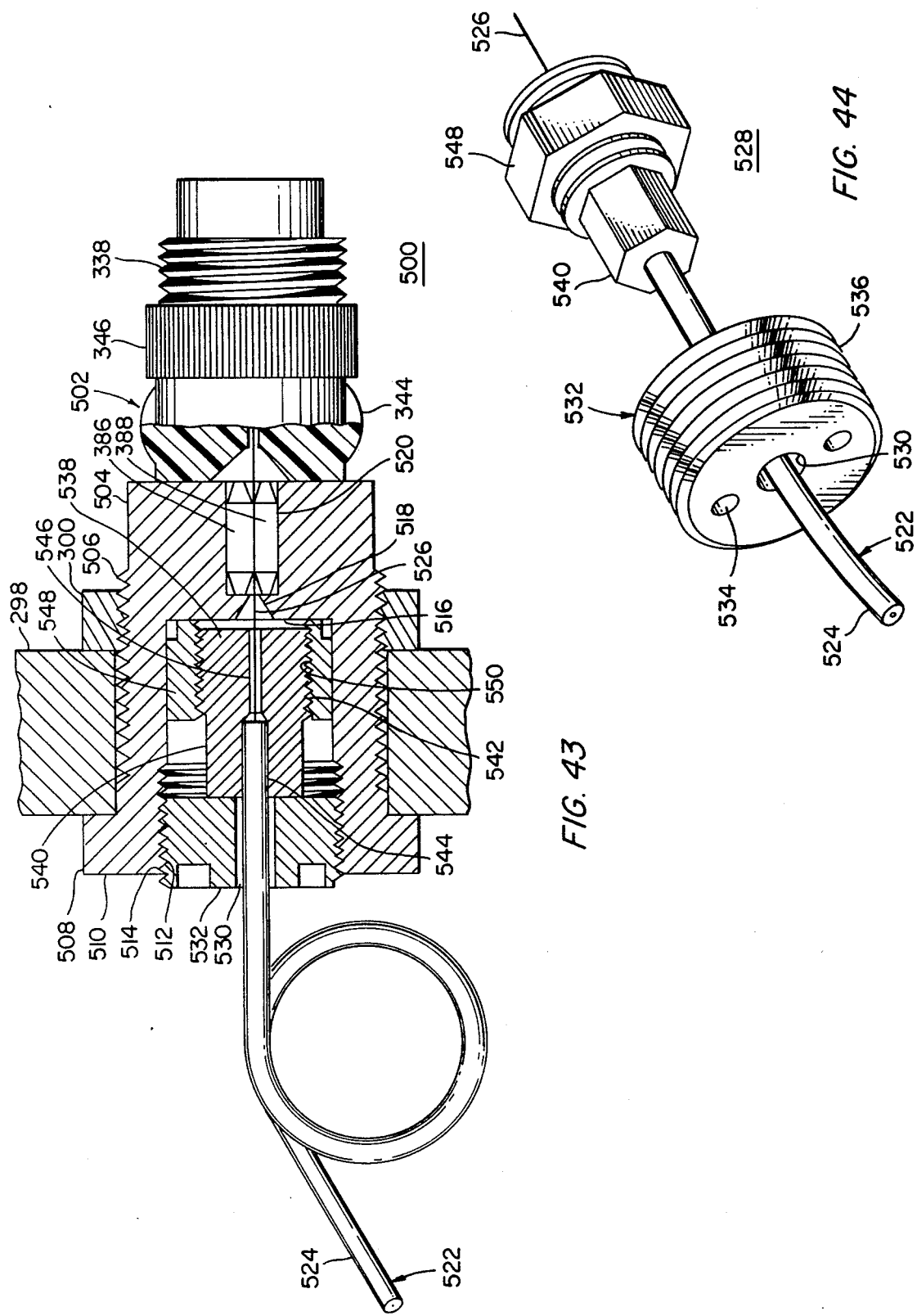

OPTICAL FIBER CONNECTOR

CROSS-REFERENCES TO RELATED APPLICATIONS

This application is a continuation-in-part of pending U.S. Pat. application Ser. No. 753,423 filed Dec. 22, 1976 now abandoned, entitled "Optical Fiber Connector" in the names of Maurus C. Logan, John M. Cole and Peter Garner and assigned to the assignee of the instant invention.

BACKGROUND OF THE INVENTION

1. Field of the Invention

The invention is directed to connectors for coupling together one or more individual fibers to a like number of fibers to provide an extended signal transmission line.

2. Description of the Prior Art

Until recently, signals were transmitted through optical wave guides made up of a plurality of fibers in bundles, each fiber receiving the same signal and thus providing redundant paths so that the possibility of total signal loss was very low. This use of multiple fiber bundles minimized alignment problems and allowed for low accuracy connections without a loss of information transmitted. The bundle was, unfortunately, rather large and inflexible and most optical wave guides were necessarily relatively short and straight.

Recently, techniques have been developed whereby high strength, low loss glass and plastic fibers are now possible. Also, due to the great band width, which is possible, as many as 50,000 conversations can now be transmitted on a single fiber. The biggest remaining problem is a connector for coupling individual fibers of two cables with low loss characteristics. The cables can take the form of flat cables wherein layers of material are bonded over and around individual fibers, somewhat in the manner of forming conventional round conductor flat cable. Also, the cables can take circular configurations using a support core or support strands interleaved with optical fibers. The cable can carry as few as one fiber or as many as ten or more fibers. Other configurations of cables can be used in whatever form is desirable.

Some of the devices being used as connectors resemble those devices used to join metallic conductors and are crimped, compressed or clamped to the individual fibers. The brittleness and size of the glass fibers, particularly, make such techniques unsuitable to this new medium.

SUMMARY OF THE INVENTION

The present invention overcomes the difficulties of handling and coupling small diameter optical fibers or wave guides in a single or multi-channel cable. At least one major member has coupled thereto, with a resilient member, a support means having one or more grooves therein, each groove to accept initially a single optical fiber. The first member, upon proper plugging into the coupler, has its support means latched so that it cannot retract from its position below or around and in support of the fibers of a first optical cable. As the second major member is moved into position in the coupler, the second support means is caused to retract from its initial position in support of and below or around the fibers of the second optical cable. As the second support means retracts, the fibers of the second optical cable are introduced into the corresponding grooves of the first support means adjacent the fibers of the first optical cable. The presence of a tight clamp and a loose clamp and an accumulation region therebetween, provides for fiber movement during coupling. Strain relief for the cable prevents any forces on the cable to be transmitted to the exposed fibers. Upon detachment of the connector, the second support means moves back under or around and into protection of the exposed fibers of the second optical cable. Similar approaches can be used for cables having from one fiber to many. It is an object of this invention to provide a novel connector for optical wave guides.

It is still another object of this invention to provide a novel connector wherein a number of channels of an optical cable can be coupled and decoupled simultaneously.

It is another object of this invention to provide a connector wherein the fibers are supported and protected from initial cable preparation to cable coupling.

It is another object of this invention to provide a connector wherein the fibers are supported and protected once the decoupling is completed.

It is still another object of this invention to provide a resiliently coupled fiber support means the position of which is controlled by the coupler.

It is still another object of this invention to provide a resiliently coupled fiber support means the position of which is controlled by the coupler or other major member.

Other objects and features of the invention will be pointed out in the following description and claims and illustrated in the accompanying drawings, which disclose, by way of example, the principles of the invention and the best modes which have been contemplated for carrying them out.

BRIEF DESCRIPTION OF THE DRAWINGS

In the drawings in which similar elements are given similar reference characters:

FIG. 1 is a side elevational view of the joint between two optical cables joined by a connector constructed according to the concepts of the invention.

FIG. 2 is a side elevational view of the connector of FIG. 1 with the protective boots removed to better illustrate the details of such connector.

FIG. 3 is a top plan view of the connector of FIG. 2.

FIG. 23 is a side elevation of the coupler of the connector of FIG. 2.

FIG. 24 is a sectional view of the coupler of FIG. 23.

FIG. 25 is a top plan view of the coupler spring.

FIG. 26 is a side elevation, partly in section, of the coupler spring taken along the lines 26—26 of FIG. 25.

FIG. 27 is a front elevation of the coupler spring.

FIG. 34 is a side elevation of a further connector constructed in accordance with the concepts of the invention.

FIG. 35 is a side elevation of the coupler of the connector of FIG. 34.

FIG. 36 is a top plan view of the coupler of FIG. 35.

FIG. 38 is an end view of the subassembly of FIG. 37 taken along the lines 38—38.

FIG. 39 is a side elevation, partly in section, of the coupler of the connector of FIG. 34.

FIG. 40 is an end view of the coupler of FIG. 39 taken along the lines 40—40.

FIG. 42 is an end view of the subassembly of FIG. 41 taken along the lines 42—42.

FIG. 43 is a side elevation of a modification of the connector of FIG. 34.

FIG. 44 is a prospective view of a subassembly of the connector of FIG. 43.

DESCRIPTION OF THE PREFERRED EMBODIMENTS

Figure 4:
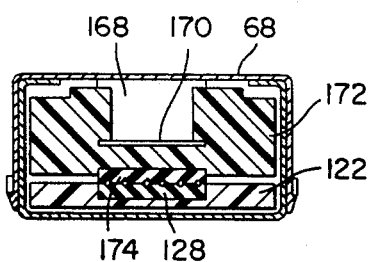
FIG. 4 is a sectional view of the connector of FIG. 2 taken along the lines 4—4 of FIG. 2.

Turning now to FIGS. 1 to 4, a connector 50 constructed in accordance with the concepts of the invention is shown. In FIG. 1, connector 50 is shown coupling optical cable 56 to optical cable 58. The term "cable" is directed to a structure of one or more optical fibers, or wave guides, strength members, cores or jackets and the like. In this terminology the fibers are equivalent to individual conductors, not strands, and a buffering layer is equivalent to the insulation of a wire. As shown in FIG. 1, an insulating boot 52 covers a first portion of connector 50 and overlaps an insulating boot 54 which covers a second portion of connector 50. The boots 52, 54 prevent mechanical injury to the fibers or the introduction of extraneous light or dirt and moisture at the fiber joints.

Optical fibers generally have a central core of glass or plastic and then a cladding of glass or plastic film such that light traveling at an angle to the longitudinal axis of the fiber is reflected back into the fiber to minimize transmission loss. The juncture between individual fibers may be made by direct contact therebetween or spaced slightly apart, and with or without an index matching substance therebetween (one having the same index of refraction as the core, in order to minimize loss at the joint). The fiber ends should be cleaved at as close to perpendicular to the longitudinal axis of the fiber as is possible. Extreme care must be taken to keep the longitudinal axis of both fibers parallel and colinear, as any misalignment will cause additional transmission loss.

As shown in FIGS. 2, 3 and 4, connector 50 is made up of a first member 60, a support member 62 resiliently coupled to member 60 and a second member 64 with a resiliently coupled support member 66 all held together in coupler 68. As will be evident from the descriptions below, the ends of the individual fibers of cable 56 are set at a position approximately the midpoint of the support member 62. Thus, the half of support member 62 closest to the coupler 68 has no fiber in the grooves of this region. The fibers of cable 58 are similarly positioned with respect to support member 66. When member 64 is inserted into coupler 68 the position of the fibers on support member 66 are fixed. When the second member 60 is engaged into coupler 58, the support member 62 is displaced to the left of FIG. 2 causing the fibers of cable 56 to be inserted into the grooves of support member 66 adjacent the fibers of cable 58.

Figure 5:
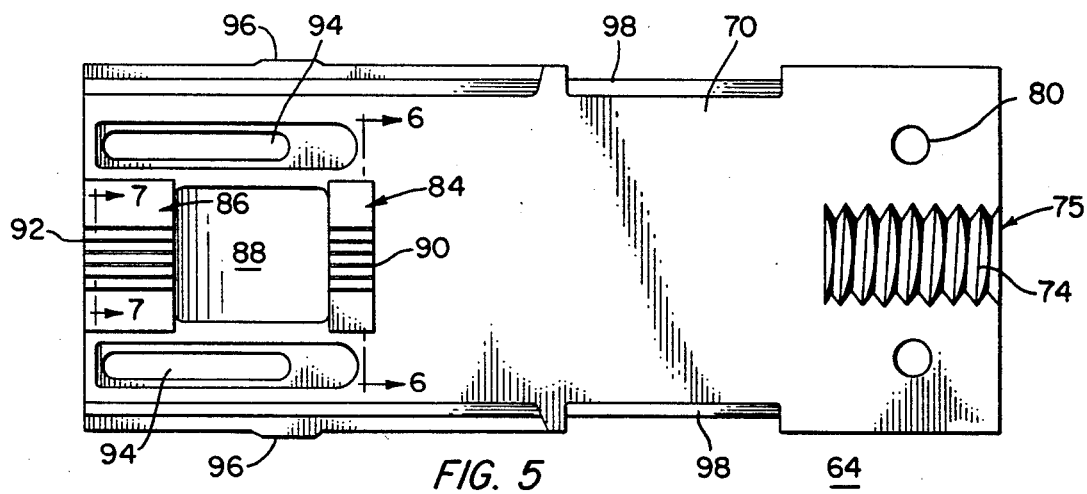
FIG. 5 is a bottom plan view of the first base member.
Figure 6:
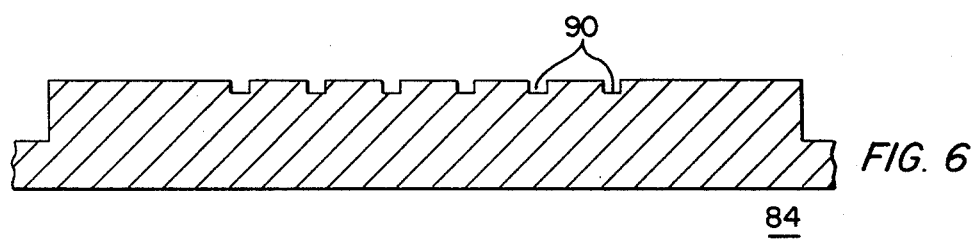
FIG. 6 is a sectional view of the tight clamp area of the connector of FIG. 2 taken along the lines 6—6 in FIG. 5.
Figure 8:
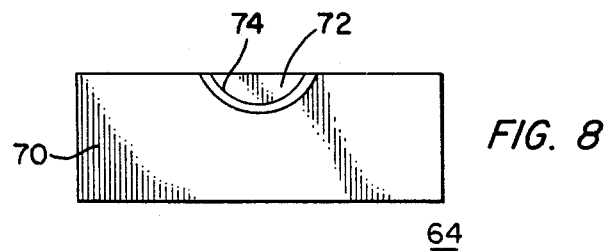
FIG. 8 is an end view of the cable strain relief area of the connector of FIG. 2.
Figure 9:
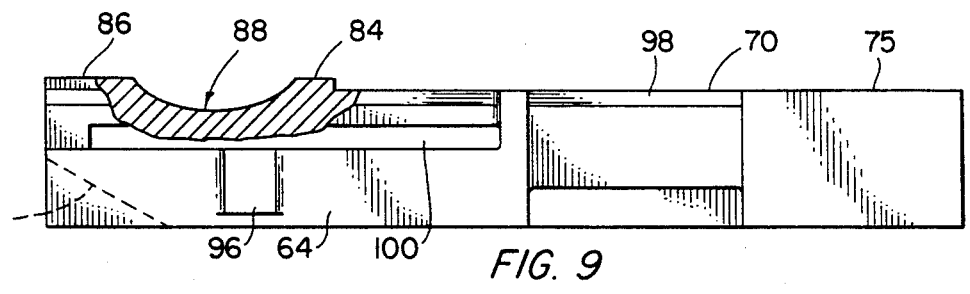
FIG. 9 is a side elevational view partly cut away and partly in section of the first base member shown in FIG. 5.

Member 64, as is shown in FIGS. 5 and 9, has a flat extended platform 70 hollowed out as at 72 (See FIG. 8) with the hollow serrated as at 74 to provide a strain relief 75 for the incoming cable. A block 76 (See FIG. 2), also hollowed out and serrated, is fastened by fasteners 80 (See FIG. 3) to grasp the cable 58 and prevent forces applied to the cable 58 from being transferred to the individual fibers. At the opposite end of member 64 is a tight clamp 84 and a loose clamp 86 separated by a hollowed out accumulation region 88. The tight clamp 84, as is better shown in FIG. 6, is made up of a series of rectangular grooves 90 and a pad, to be described below, which tightly holds the fibers of cable 58. The rectangular shape of the grooves 90 provides adequate space for the splaying of the fibers. The cable 58 is stripped of its outer jacket at a position close to the cable strain relief clamp 75 and the exposed fibers are splayed out to enter the grooves 90 of the tight clamp 84. The wide base of the rectangular grooves 90 allows the transition of the fibers from a round configuration to a splayed flat configuration to take place without undue strain on the fibers.

Figure 7:
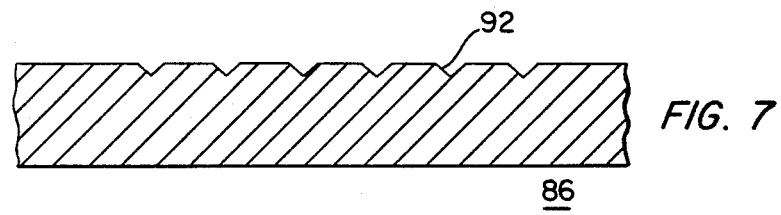
FIG. 7 is a sectional view of the loose clamp area of the connector of FIG. 2 taken along the lines 7—7 in FIG. 5.

At the left most end of member 64 (See FIG. 5) is the loose clamp 86 made up of a series of V-notches 92, as is better seen in FIG. 7. A pressure pad, to be described below, with respect to the coupler 68 retains the fibers in the notches 92. The V-notches 92 are open initially and thus the fibers are free to move in a direction parallel with the longitudinal axis of the fibers. The closing of the V-notches 92 by the pressure pad effectively provides a three-point contact to center and align the individual fibers. Since the fibers are made of harder material than the plastic materials of the various fiber supports, the downward pressure of the pressure pad during assembly permits deflection of such fiber support surfaces to permit alignment of the longitudinal axis of each of the fibers. The presence of the tight clamp 84 prevents the fibers from backing up in the region between tight clamp 84 and strain relief clamp 75. The forces applied to the fibers result in a bowing of the fibers into the accumulation region 88. The depth and length of the accumulation region 88 is chosen in accordance with the characteristics of the fibers and the forces expected. To limit excess fiber displacement in a direction perpendicular to the longitudinal axis of the fibers, dividers may be placed in the accumulation region 88. Two slots 94 flank the clamps 84, 86 and receive one end of resilient members which couples member 64 to the transfer plate to be described below. A rib 96 is placed on the parallel long sides of member 64 adjacent the slot 94. A recess 98 is provided to receive the tabs of the plate associated with tight clamp 84. A further recess 100 (See FIG. 9) is provided to permit the transfer plate to be affixed to the member 64.

Figure 12:
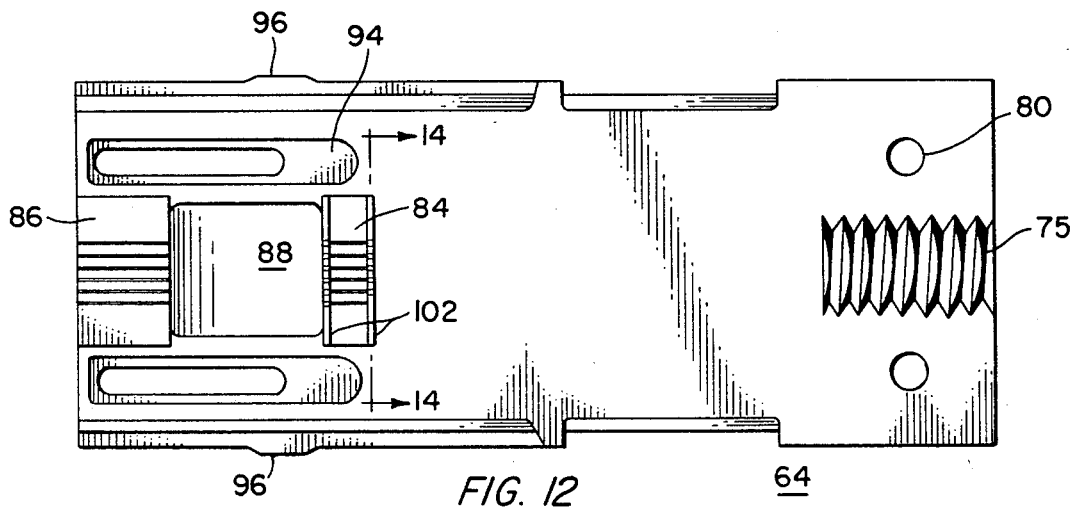
FIG. 12 is a bottom plan view of a modification to the tight clamp area of the connector of FIG. 2.
Figure 13:
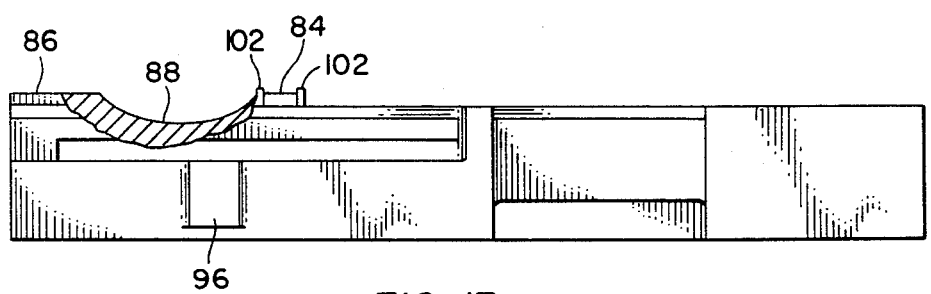
FIG. 13 is a side elevational view, partly cut away and partly in section, of the modified first base member of FIG. 12.
Figure 14:
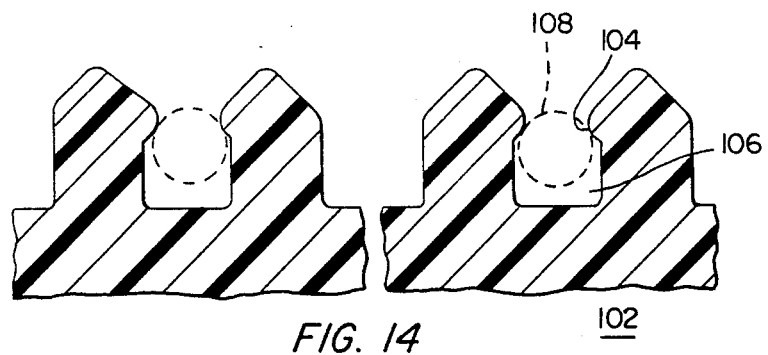
FIG. 14 is a sectional view of the fragmented portion of a fiber retainer taken along the lines 14—14 of FIG. 12.

To prevent the fibers from coming out of the tight clamp 84, before the pad is in place, a pair of plates 102 with restricted entrance 104 slots 106 (See FIG. 14) is provided adjacent the two ends of the tight clamp 84 grooves 90 (See FIGS. 12 and 13). The fibers 108, as shown in phantom line in FIG. 14, are snapped through the restricted entrances 104 into the slots 106 where they remain until intentionally removed.

Figure 10:
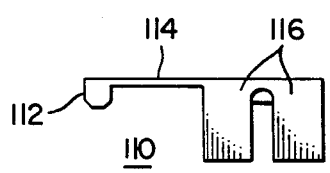
FIG. 10 is a side elevation of the upper member of the tight clamp.
Figure 11:
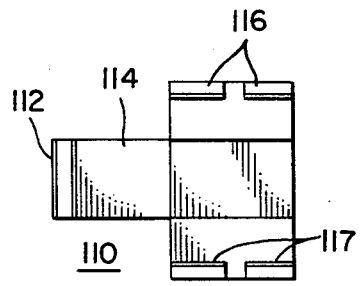
FIG. 11 is a top plan view of the upper member of the tight clamp of FIG. 10.
Figure 15:
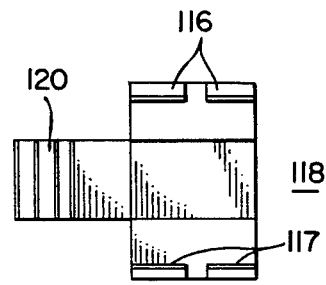
FIG. 15 is a top plan view of the upper member of the modified tight clamp of FIG. 12.

The pad which completes the tight clamp 84 is part of a clamp plate 110 shown in FIGS. 10 and 11. Pad 112 is formed at the end of beam 114 whose other end terminates in a pair of bifurcated arms 116. Inturned ribs 117 extend at the ends of arms 116 and grip one defining surface of recess 98 to join clamp plate 110 with the member 64. The clamp plate 118, used with the modification of FIGS. 12 and 13, is shown in FIG. 15 where the pad 120 is placed inwardly from the end of beam 114 so that pad 120 contacts the tight clamp 84 area without engaging the plates 102.

Figure 16:
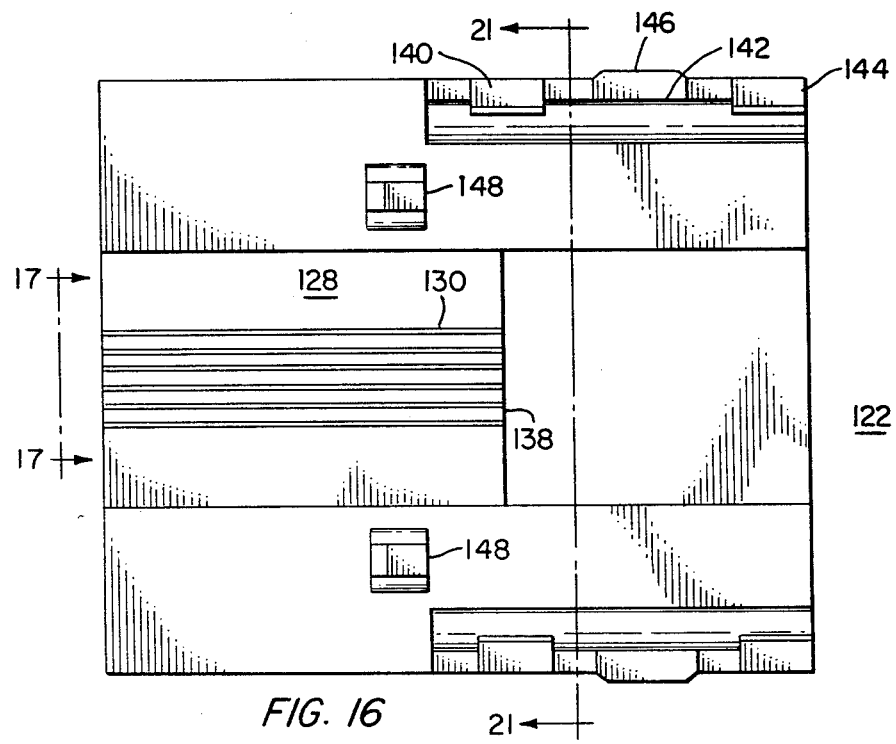
FIG. 16 is a top plan view of the transfer plate of the connector of FIG. 2.
Figure 17:
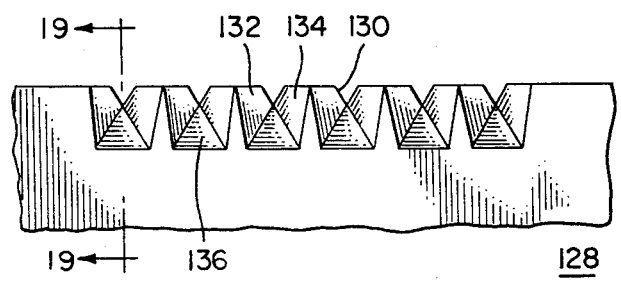
FIG. 17 is an end view of the fragmented grooved portion of the transfer plate taken along the lines 17—17 of FIG. 16.
Figure 18:
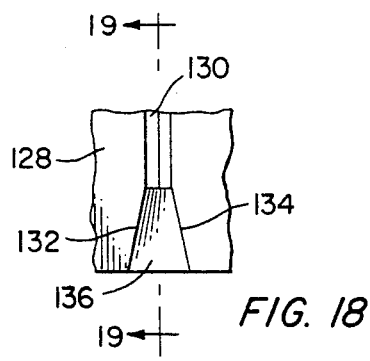
FIG. 18 is a fragmentary, enlarged top plan view of a groove of the transfer plate.
Figure 19:
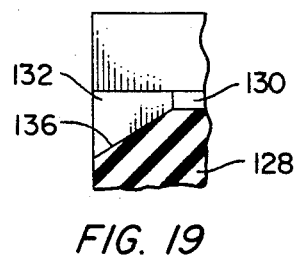
FIG. 19 is a fragmentary, enlarged portion, partly in section, of a groove of the transfer plate taken along the lines 19—19 of FIG. 18.
Figure 20:
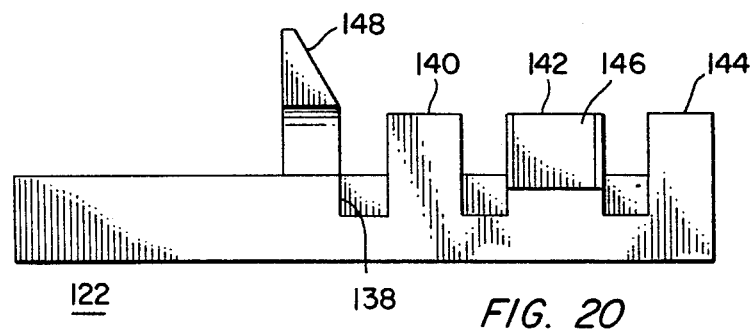
FIG. 20 is a side elevational view of the transfer plate.
Figure 21:
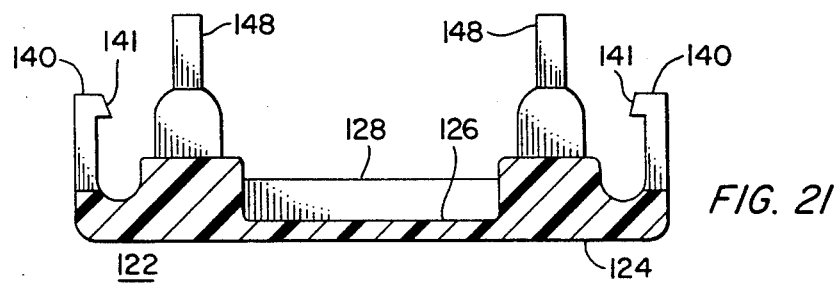
FIG. 21 is an end view, partly in section, of the transfer plate of FIG. 16 taken along the lines 21—21.

Turning now to FIGS. 16 to 21, the details of the transfer plate 122 are shown. Transfer plate 122 has a base 124 with a central recess 126 which at one end receives a plastic pad 128 in which are placed a series of slots 130 for receipt of the fibers to be joined. The main portion of slot 130 is a V-notch, as is evident from a viewing of FIG. 17. The pad 128 overlies the V-notches 92 of the loose clamp 86 to complete the loose clamp 86. The entrance to each of the slots 130, at the left of FIG. 16, is tapered on three sides, as is shown in FIGS. 18 and 19. FIG. 18 shows the sides of slots 130 tapered as at 132, 134 while FIG. 19 shows the bottom of slots 130 tapered as at 136. The tapering of the slots 130, as at 132, 134 and 136 makes it simpler for an entering fiber from the other cable to find the correct slot 130 and be led into the main portion thereof.

Figure 22:
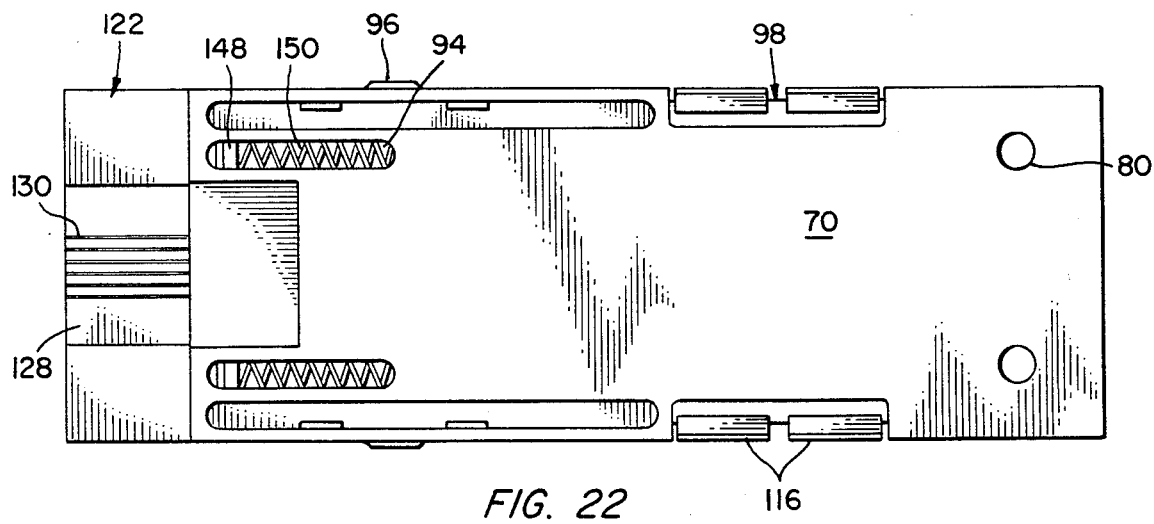
FIG. 22 is a top plan view of the assembled transfer plate and the first base member.
Figure 28:
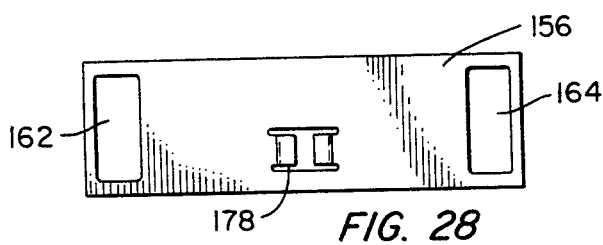
FIG. 28 is a side elevational view of the coupler housing.
Figure 29:
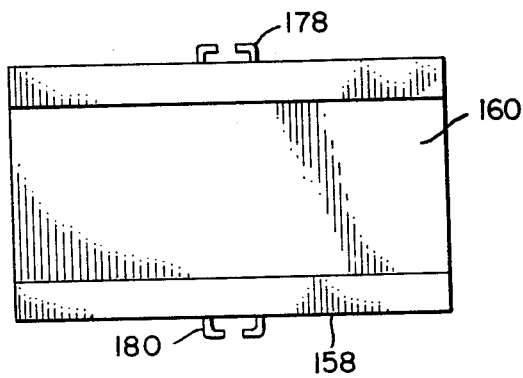
FIG. 29 is a top plan view of the coupler housing of FIG. 28.
Figure 30:
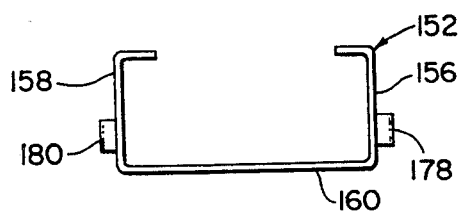
FIG. 30 is a front elevational view of the coupler housing of FIG. 28.

The step 138 (FIG. 20) provides a shoulder for the end of beam 114 of clamp plate 110 to engage and thus limit the backward movement of transfer plate 122. The alignment of the transfer plate 122, as it moves along member 64, is controlled by a series of tab pairs 140, 142 and 144 which engage at inturned ribs 141 a surface defining the recess 100 shown in FIG. 9 (only one of each tab pair is visible in FIG. 20, and the pair of tabs 140 in seen in FIG. 21). Tabs 142 have, in addition, a detent 146 adjacent their free ends, the functions of which will be set forth below. Upright members 148 engage one end of the resilient member extending between transfer plate 122 and member 64 to place the transfer plate 122 initially into the position shown in FIG. 22 ahead of the member 64. Also, anytime the member 64 is released from the coupling 68 the resilient member will return the transfer plate 122 to the same position.

The upright members 148 extend into slots 94, which also guides the transfer plate 122 as it moves, and there engages one end of the resilient member or compression spring 150 the other end of which engages the end of slot 94 adjacent the accumulation region 88.

Coupler 68 is shown in FIGS. 23 to 30 to which reference is now made. The coupler 68 is made up of a housing 152 and a spring unit 154. Housing 152 is rectangular in form having two parallel spaced apart walls 156, 158 and a bottom 160 with a generally open top. In each of the walls 156, 158 are placed two windows 162, 164, one near each end. The windows 162, 164 are proportioned to receive the rib 96 of the member 64 and detent 146 of the transfer plate 122, for purposes to be described below. Spring unit 154 is made up of a base 166 with two depending spring arms 168 terminating in tab portions 170 formed in parallel with and spaced apart from the bottom 160 of housing 152. The tab portions 170 engage a pressure plate 172 having a plastic pad 174 on its underside. This pad 174 will engage the upper surfaces of the fibers resting in the slots 130 and thus hold the fibers in the slots 130.

The spring unit 154 and housing 152 are locked together by the arms 176 depending from base 166 along the walls 156, 158 to the retainers 178, 180 on the walls 156, 158 respectively. (See FIGS. 23 and 30). The upturned ends 182 of arms 176 grip the bottom of housing 152 to lock the coupler 68 into a single element.

Both members 60 and 64 are identical in all aspects, thus the description of member 60 is the same as that which appears above with respect to member 64.

To use the connector 50 of the invention a length of the outer protective jacket of a cable 58 is removed and the stripped fibers are permitted to extend beyond the end of member 64. The protective cable jacket is introduced into strain relief 75 and by applying block 76 with fasteners 80 the cable is securely held. The individual fibers are arranged to extend to the mid point of the extended transfer plate 122 when assembled to member 64 with compression springs 150 in place. The fibers 108 are snapped into slots 106 of plates 102 through restricted entrances 104 of the slots 106. The clamp plate 118 is now snapped into place with the inturned ends 117 of arms 116 engaging the defining wall of slot 98 and the pad 120 causing the fibers to be retained in tight clamp 84. Now the transfer plate 122 is positioned over the bottom of member 64 and assembled thereto with the inturned ribs 141 of the tabs 140, 142 and 144 engaging a surface defining the recess 100. The upright members 148 extend through slots 94 and are engaged by compression springs 150 terminating at one end of slots 94. The slots 130 in pad 128 complete the loose clamp 86 and complete the assembly of the members 60 and 64.

With the spring unit 154 partially assembled to housing 152, the assembled member 64 is inserted into place in the coupling 68 until the ribs 96 of the member 64 and the detents 146 of the transfer plate 122 extend through the windows 164. (See FIG. 2). This establishes transfer plate 122 of support member 66 associated with member 64 as the fixed plate which will receive both fibers to be coupled. The member 60 is now introduced into the coupler 68 until ribs 96 of the member 60 engage the window 162 and lock the members together. Because the position of the transfer plate 122 of support member 66 associated with member 64 is locked, it will not permit the transfer plate 122 of support member 62 associated with member 60 to seat and the latter will be forced to retract to a position fully under the member 60 with the individual fibers inserted into the slots 130 of the first transfer plate 122 of support member 66. At this point, the spring unit 154 is snapped into place so that the connector 50 is locked and pad 174 impresses equal forces on the fiber 108. The shrouds, or insulating boots 52, 54, can now be put in place to complete the assembly.

Figure 31:
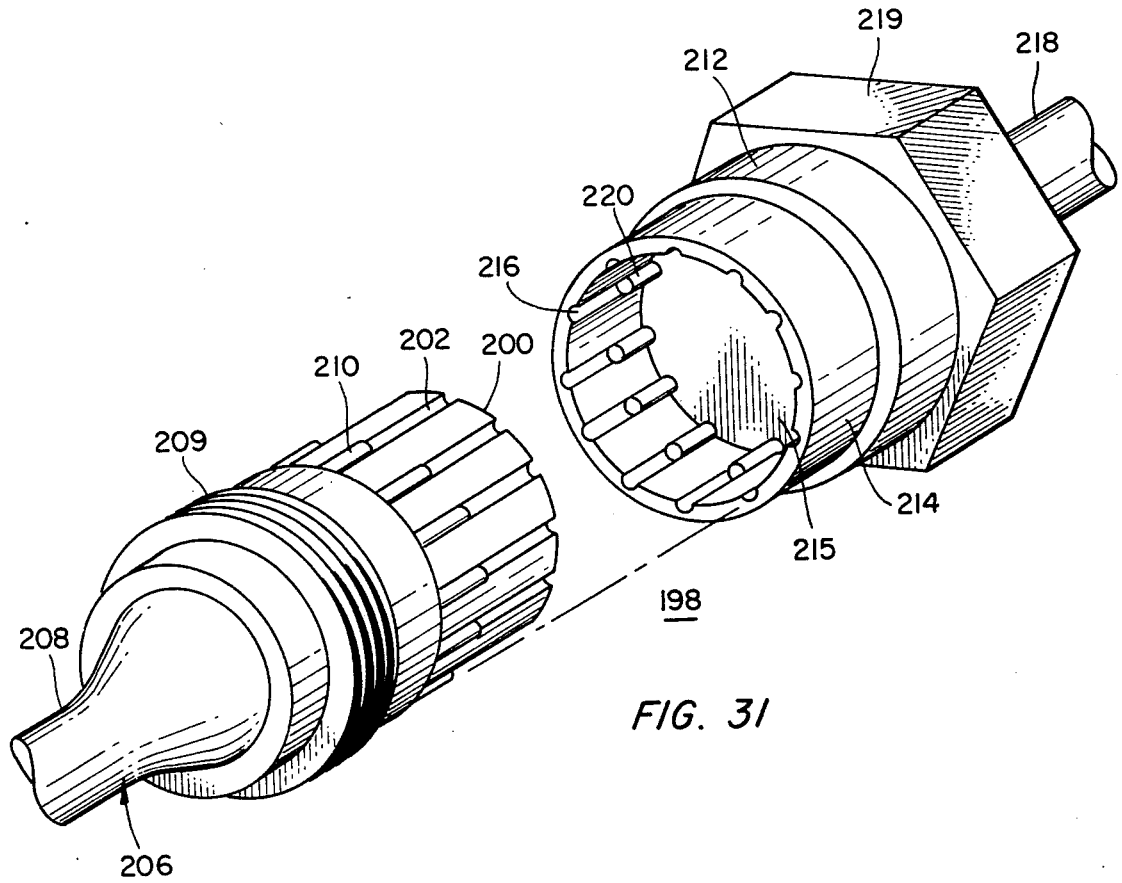
FIG. 31 is an isometric drawing of a circular type of connector constructed in accordance with the concepts of the invention.

The connector 50 can handle cables with their fibers arranged in a circular pattern or in a side by side flat cable arrangement merely by providing an appropriately formed strain relief clamp 75 and by providing sufficient member length to permit the fibers to go from the round to a flat configuration. In FIG. 31 there is shown an approach that can be used for wave guides arranged in a circular pattern. A spring-loaded core 200 having a plurality of recesses 202 which can be semi-circular, V-shaped, etc. is arranged for receipt of the fibers of the cable 206 from which the covering 208 has been removed to show exposed fibers 210. A circular housing 212 having a sleeve 214 is arranged with a plurality of recesses 216 semi-circular, V-shaped, etc. on the inside surface of the sleeve 214. A round cable 218 has its protective covering removed and the fibers 220 placed in the recesses 216, and held in place by core 215 of sleeve 214. As the two halves of the connector 198 are brought into contact the front surface of core 200 engages core 215 of sleeve 214 and causes the core 200 to retract, exposing more of the fibers 210 and, as core 200 continues to retract the fibers 210 enter recesses 216 adjacent fibers 220. A threaded sleeve 209 is placed over cable 206 for coupling to a gland nut 219 over housing 212.

Figure 32:
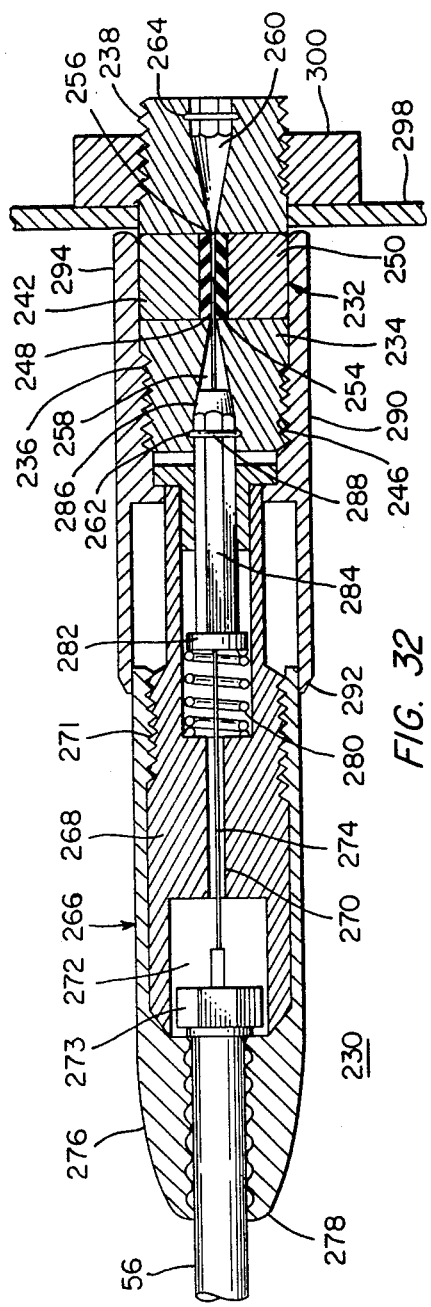
FIG. 32 is a side elevational view, partly in section, of a connector constructed in accordance with the concepts of the invention to couple two single optical fibers.
Figure 33:
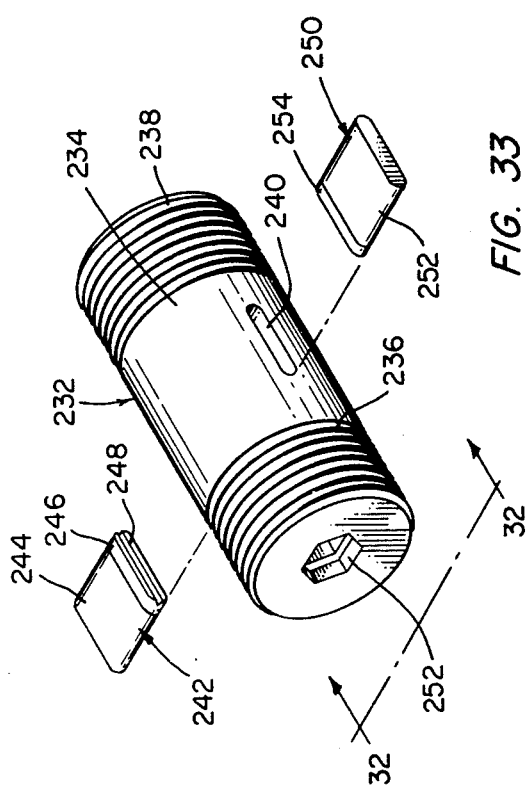
FIG. 33 is a perspective view of the coupler for the connector of FIG. 32.

A single fiber connector 230 is shown in FIG. 32 and the coupler therefore is shown in FIG. 33 as 232. Coupler 232 has a solid, central, cylindrical body portion 234 with externally threaded portions 236 and 238 adjoining body portion 234. A slot 240 is milled through the body portion 234 along a diagonal thereof. Into slot 240 is positioned a first member 242 having a metal portion 244 and a plastic or elastomeric portion 246 in which a V-notch 248 is formed. A second member 250, having a metal portion 252 and a plastic or elastomeric portion 254 is introduced into the opposite end of slot 240 into which member 242 is placed. As will be clear from the explanation below, members 242 and 250 hold the ends of the two fibers to be joined. Within the coupler 232 extends a bore 256 tapered outwardly at both ends, as at 258, 260. The bores 258, 260 are hexagonal initially and end in a circular bore in the center. In the bores 258, 260 a detent ring 262, 264 is placed. These rings will engage with a recess in the fiber supports, as later described, to prevent unwanted withdrawal of the fibers from the coupler 232.

The fiber support 266 is made up of an inner sleeve 268 having a bore 270 therethrough and an externally threaded central portion 271. In a bore enlargement 272 are placed the sleeves used to engage protective layers of the optical wave guide 274. The outer jacket is removed and the two protective layers exposed are folded back between two metallic sleeves which are then crimped in place as at 273 to provide a strain relief against forces tending to pull the fiber 274 from connector 230. One end of outer sleeve 276 is internally threaded to engage the threaded portion 271 of the inner sleeve 268. The opposite end of outer sleeve 276 has a series of grooves 278 to permit the outer jacket of the cable 56 to be gripped, providing a further strain relief. Also, outer sleeve 276 provides a stop against which the crimped sleeves 273 rest. The fiber 274 extends further along the bore 270, through spring member 280, a stop plate 282, through the hexagonally contoured pin 284, the tapered hexagonal bore 258 into the space between the members 242, 250. The end 286 of pin 284 is truncated as shown and an annular recess 288 is provided about the pin 284 to engage the detent ring 262.

The connector 230 may be installed to bulkhead 298 first by inserting externally threaded portion 238 through an aperture or knockout in the bulkhead 298 and attaching a locknut 300 thereover. Alternatively, the connector 230 may be first installed to one optical fiber and then inserting the connector 230, as aforesaid. To install the fiber support 266 into the coupling 232 it is necessary to grasp outer sleeve 276 and align the hexagonal faces of pin 284 with the hexagonal bore 258 and press it home until the recess 288 is engaged by the detent ring 262, thus initially preventing the ejection of pin 284. During such coupling spring 280 is compressed and the end of fiber 274 is extended beyond the end 286 of pin 284. With the fiber support 266 in place, it is necessary to apply the other fiber support until detent ring 264 engages the recess of such fiber support and initially holds the fiber support (not shown) in place. Then the assembly sleeve 290 is positioned and made to engage to complete the assembly of the connector 230 in bulkhead 298. End 292 of sleeve 290 grips the outer sleeve 276 while the end 294 compresses the members 242, 250 into operative position. The engagement of internal threaded portion 246 with threaded portion 236 of coupler 232 holds all parts in assembled condition.

Turning now to FIGS. 34 to 36 a further connector 320 for coupling the single fibers of optical fiber cables together and constructed in accordance with the concepts of the invention is shown. Optical fiber cable 56 is introduced through a jam nut 322, a housing 324, and a mounting nut 326 into a coupler within cam nut 328. The optical fiber cable 58 is introduced through a further jam nut 322, a further housing 324 into the same coupler within cam nut 328. Mounting nut 326 has a flange 330 arranged to be placed adjacent a first surface of a bulkhead 298. A locknut 300 or the like is advanced upon the threaded portion 332 of mounting nut 326 to tightly grip the bulkhead 298 between flange 330 and locknut 300. The coupler 334, as is best shown in FIGS. 35 and 36, is comprised of a body portion 336 having two externally threaded ends 338 and a slot 342 machined in the central portion 340. Two inserts 344, each having a V-notch 345 (See FIG. 40) to receive the optical fibers to be joined therebetween are positioned within the slot 342 and are held there by the action of retaining nuts 346 advanced upon threaded ends 338 bearing upon shoulders of the inserts 344 in a manner to be described below. Cam nut 328 bears upon the exposed, bowed surfaces 348 of the inserts 344 to insure a firm grasp of the optical fibers positioned within the coupler 334.

Figure 37:
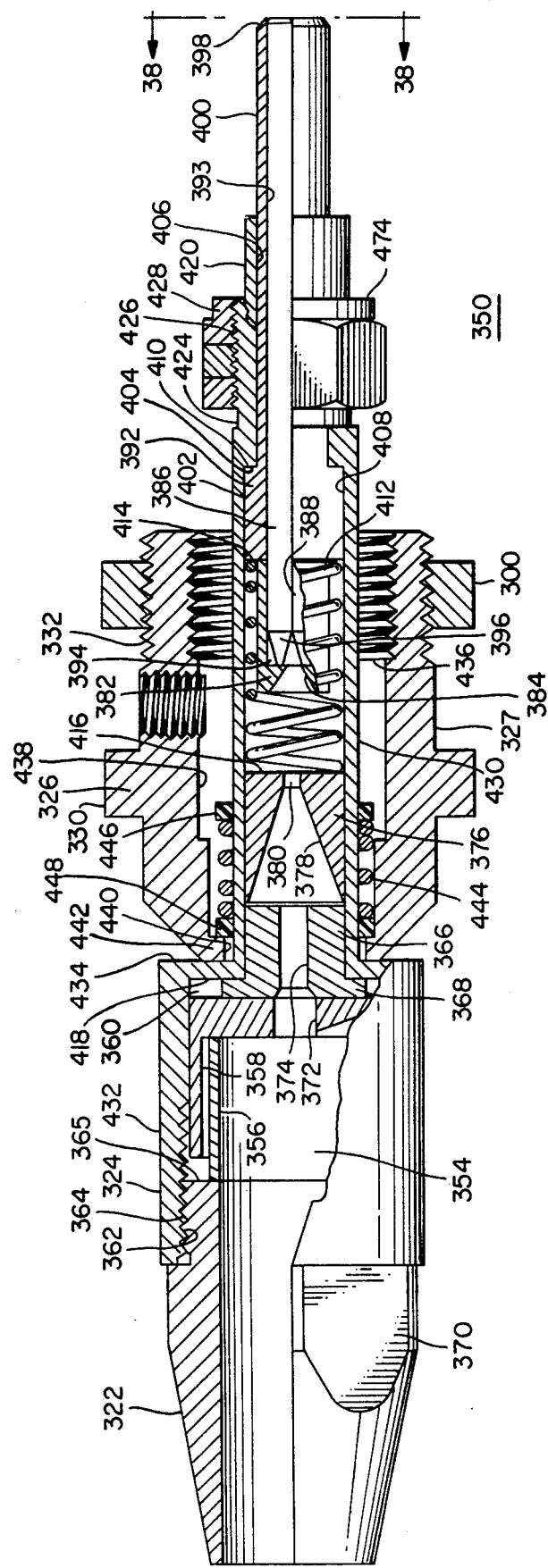
FIG. 37 is a side elevation, partly cut away and partly in section, of a subassembly of the connector of FIG. 34.

The connector 320, as is shown in FIGS. 37, 38 and 39, is made up of three main subassemblies, subassembly 350 which is secured to the fiber optic cable 56, subassembly 352 which is secured to fiber optic cable 58 and the coupler 334 for coupling the fibers of cables 56 and 58. Jam nut 322 is positioned over cable 56 for later use as will be set forth. Cable 56 is prepared by stripping the jacket from a length of the cable 56 and folding back the various braided protective layers to expose a length of the fiber. The protective layers are placed between the inner sleeve 356 and outer sleeve 358 of crimp connector 354 which are then crimped tightly to the braided layers of the cable 56. The crimped connector 354 is now introduced into the bore 360 of housing 324. The fit between the exterior of connector 354 and the interior of bore 360 is made tight to allow housing 324 to provide strain relief for the cable 56. The threaded exterior 362 of jam nut 322 is made to threadably engage the interior threaded portion 364 of housing 324 trapping the connector 354 between the leading edge 365 of jam nut 322 and the flange 368 of bushing 366 thus providing additional strain relief for the cable 56. A series of wrench flats 370 (See FIG. 34) are placed around the cylindrical central portion of the jam nut 322 to facilitate the assembly of jam nut 322 to housing 324. The fiber of cable 56 is passed through aperture 372 in outer sleeve 356, bore 374 of bushing 366 into the tapered bore 378 of a centering bushing 376. The fiber is then passed through bore 380 into the tapered bore 384 of cap 382 and thence between three rods 386, 388 and 390 (See FIG. 38) positioned within the uniform cylindrical bore 393 of pin housing 392. The three rods 386, 388 and 390 serve to align the fiber with the groove in the coupler 334, as will be described below. The concept of using three rods to align and position fibers is disclosed in U.S. Letters Pat. No. 4,019,241 issued Apr. 26, 1977 entitled Method of Splicing Elongate Members by Maurus C. Logan and assigned to the assignee of the instant invention and by this reference made a part hereof. The rods 386, 388 and 390 are contained within a pin housing 392 and within the bore 394 of cap 382. The ends of the individual rods 386, 388 and 390 are tapered as at 396 to facilitate the introduction of a fiber between them.

Pin housing 392 is tapered as at 398 to facilitate the separation of the inserts 344 of coupler 334, as will be described below. The outer surface of pin housing 392 is made up of a uniform cylindrical portion 400 of a first diameter and a short cylindrical portion 402 of greater diameter providing a shoulder 404 at the transition. Housing 324 has a first bore 406 in which it receives cylindrical outer portion 400 of pin housing 392. A second bore 408 receives cylindrical portion 402 of pin housing 392. The transition between bore 406 and 408 provides a shoulder 410 which acts as a stop when engaging shoulder 404 of pin housing 392 to limit the movement of the pin housing 392 away from bushing 366. A compression spring 412 acts against end face 414 of pin housing 392 and against end face 416 of bushing 376 to attempt to advance the pin housing 392 to the position shown in FIG. 37. The end face 398 of the pin housing 392 is tapered so that as the pin housing 392 engages the inserts 344 of coupler 334 the rods 386, 388 and 390 retract inserting the bare fiber into the grooves of the inserts 344. However, as soon as the subassembly 350 is withdrawn from coupler 334, spring 412 causes the pin housing 392 to cover the exposed fiber and protect it from accidental contact or the environment about the fiber. A shoulder 418 between bores 408 and 360 is engaged by flange 368 of bushing 366.

The exterior of housing 324 is made up of a series of cylindrical portions of increasingly larger diameter. A keying cylindrical portion 420 has a flat 422 (see FIG. 38) to assure proper alignment of the housing 324 and prevents the undesired twisting of the fiber during coupling and assembly of the mounting nut 326 with the threaded portions 338 of the coupler 334. A further cylindrical portion 424 of the housing 324 is threaded as at 426 to receive thereon the adjustment collar 428. The adjustment collar 428 is adjusted to control the position of the fiber in the coupler 334, as will be described below. The third cylindrical portion 430 and the fourth portion 432 have a shoulder 434 therebetween which limits the movement of the mounting nut 326. The mounting nut 326 has wrench flats 327 adjacent the flange 330. A wrench applied to flats 327 permits the mounting nut 326 to be tightened upon the coupler 334. Further, as was stated above, mounting nut 326 has an externally threaded portion 332 to receive a locknut 300. Within threaded portion 332 is an internally threaded portion 436 to threadably engage the threaded portion 338 of the coupler 334. The bore 438 of mounting nut 326 is greatly diminished to provide an opening 440 somewhat larger than the diameter of housing portion 324 to provide an annular ring 442. A compression spring 444 is positioned between annular rings 446, 448 and all three are capable of sliding over the outer surface 430 of the housing 324. Annular ring 446 is able to move until it is in contact with adjustment collar 428. Annular ring 448 is capable of movement until it contacts annular ring 442. As the mounting nut 326 is threadably engaged upon the threaded portion 338 of the coupler 334, the compression spring 444 is compressed between the annular ring 446 in contact with adjustment collar 428 on one side and annular ring 448 in contact with annular ring 442 of mounting nut 326. Since the mounting nut 326 is fixed by its engagement with the coupler 334, spring 444 acts upon the pin housing 392 to insure that the fiber is always urged into the coupler 334.

Figure 41:
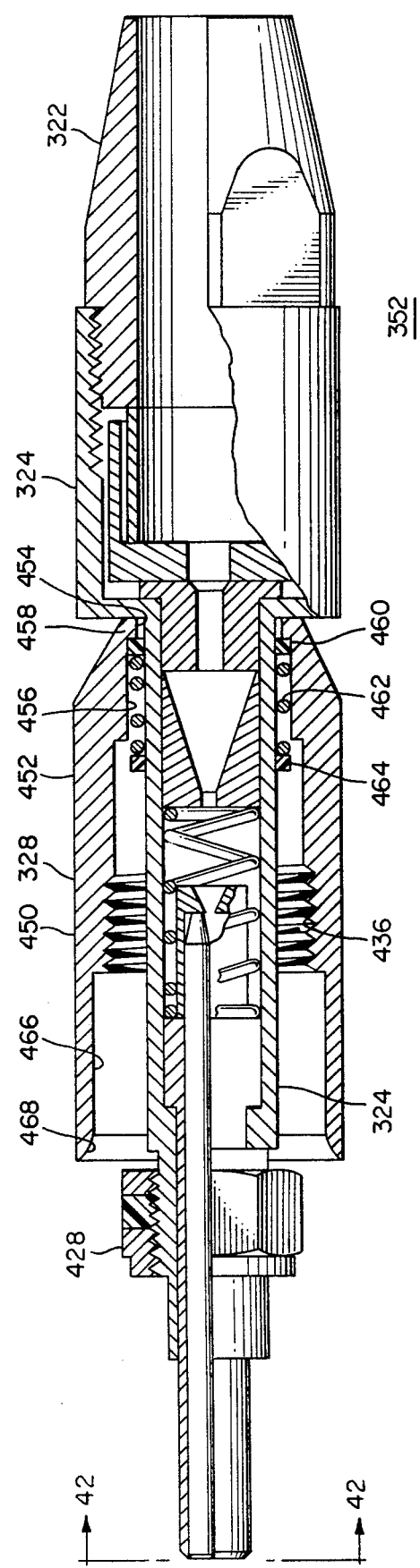
FIG. 41 is a side elevation, partly in section and partly cut away, of a further subassembly of the connector of FIG. 34.

The subassembly 352 of FIGS. 41 and 42 is essentially the same as subassembly 350 of FIGS. 37, 38 and, accordingly, will not be set forth again. A cam nut 328 is provided in place of mounting nut 326. Cam nut 328 has a generally uniform, cylindrical outer surface 450 with knurling along a section 452 to facilitate assembly of the cam nut 328 with the coupler 334. Bore 454 is slightly larger than the diameter of housing 324 and communicates with bore 456 providing a stop shoulder 458 therebetween. Stop shoulder 458 engages the annular ring 460 which pushes compression spring 462 and annular ring 464 towards adjustment collar 428 for the purpose of assuring full insertion of the fiber into coupler 334. A further bore 466 in cam nut 328 is provided to engage the curved surfaces 348 of the inserts 344 and compress the inserts 344 about the fibers in the coupler 334. A tapered lead in 468 permits the compression force to be applied gradually.

Turning now to FIGS. 39 and 40 the details of coupler 334 will be set out. Coupler 334 has a first bore 470, which is generally cylindrical except for the flat 472. The flat 422 of the keying cylindrical portion 420 is mated with flat 472 of the bore 470 to prevent rotation of the housing 324 upon assembly to the coupler 334. The bore 470 is large enough to accept all of portion 420. The extent to which the housing 324 can be inserted into the coupling 334 is determined by the position of the adjustment collar 428. The required position for the fiber is at approximately the midpoint of the inserts 344. The adjustment collar 428 is moved along the threaded portion 426 of housing 324 until the fiber extends to the desired point. The adjustment collar 428 is then crimped in position such that it cannot be changed thereafter to insure that the fiber will take the same position regardless of the number of couplings or uncouplings of connector 320. Face 474 (See FIG. 37) of adjustment collar 428 abuts face 476 of coupling 334 to limit the insertion of the housing 324 into coupling 334.

The inserts 344 have shoulders 478 to each side of the bowed surfaces 348. These shoulders 478 are gripped by the retainer nuts 346 to hold the inserts 344 within slot 342. At the interior surface of each of the inserts 344 is placed a V-notch 345 to receive the single fibers of cables 56, 58. The fibers are not firmly gripped until the inserts 344 are compressed by the action of the cam nut 328 on the bowed portion 346 of the inserts 344. To insure that the fibers are not prevented from entering the notches 480, the portions of the inserts 344 adjacent the V-notches 480 are tapered as at 482. As the housing 342 is inserted into the coupler 334, the tapered end 416 is wedged against the tapered surfaces 482 of the inserts 344 forcing them apart and thus preventing the application of forces to the fiber prior to the time that the inserts 344 are compressed. Inserts 344 are limited in their movement by the engagement between shoulders 478 and retainer nuts 346. Thus, once the inserts 344 are separated sufficiently, the inserts 344 are prevented from further movement and engagement with tapered surfaces 482 causes the pin housing 392 and the rods 386, 388 and 390 to retract exposing the fiber and inserting it into slots 345 of the inserts 344.

To employ the connector 320, the cables 56 and 58 will have to be prepared. The jackets will be removed for a length of two or three inches. Jam nuts 322 will be placed on the cables 56, 58 and then the various braided layers will be peeled back. The braided layers will be placed between inner sleeve 356 and outer sleeve 358 of connector 354. The connector 354 will then be crimped and jammed into bore 360 of housing 324 with the fiber extending through bore 372, bore 374 of bushing 366, bores 378, 380 of bushing 376, through bore 384 of cap 382 into the interspace between the rods 386, 388 and 390. The subassembly 350 is then inserted in a tool having the properties of coupler 334, that is to make the fiber extend outside of the pin housing 392. The fiber will then be cut to its desired length and the adjustment collar 428 adjusted and crimped so that when the subassembly 350 is inserted into coupler 334 the fiber will extend the desired amount into the V-notches 345. The jam nut 322 is then fixed into position with respect to housing 324. At this point, the two subassemblies 350, 352 are complete and are ready to be coupled together in coupler 334. The pin housing 392 is positioned so that flat 422 of the keying cylindrical portion 420 is aligned with flat 472 and the pin housing 392 is inserted through bores 470 and 478 until face 474 of the adjustment collar 428 abuts face 476 of the coupler 334. The threaded portion 436 of mounting nut 326 is made to threadably engage threaded portion 338 of the coupler 346. This assembly causes the tapered surface 398 of pin housing 392 to engage the tapered surfaces 482 of inserts 344 separating them to allow the fiber to be inserted in V-notch 345 and then retracting pin housing 392 and the rods 386, 388 and 390. Subassembly 352 is now inserted into coupler 334 and the fiber contained therein is positioned in the V-notches 345 in the inserts 334. The cam nut 328 is now moved into position with bore 466 overlying the bowed portions 346 of the inserts 344 and compressing same to tightly grip the two fibers in position in V-notches 345 of the inserts 344. The threaded portion 436 of cam nut 328 is made to threadingly engage threaded portion 338 of coupling 334 completing the assembly.

A pigtail connector 500 is partially shown in FIGS. 43 and 44. Connector 500 employs a coupler 502 similar to coupler 334 of FIGS. 39 and 40 except that one of the retainer nuts 346 is omitted. The second fiber to be coupled by the connector 500 is contained in a subassembly (not shown) the same as subassembly 352 of FIGS. 41 and 42. Housing 504 has an externally threaded portion 506 and ends in a flange 508 such that connector 500 can be mounted to a bulkhead 298 using a locknut 300 threadably engaging portion 506. Housing 504 has a bore 512 extending inwardly from rear wall 510 towards the coupler 502 and terminating in a wall 516. A tapered bore 518 leads from wall 516 to the interspace between the rods 386, 388 and 390 (not shown) located in bore 520.

A cable 522 is prepared by stripping the jacket 524 off of a length of optic fiber cable 522 to expose the fiber 526 therein. The fiber is assembled to a subassembly 528 and then coupled to housing 504. The jacketed cable 522 is passed through aperture 530 in a seal 532 and which has two apertures 534 to facilitate its assembly to housing 504 by means of its external threaded portion 536 engaging threaded portion 514 of housing 504. An adjustable collar 538 has a cylindrical portion 540 and an externally threaded portion 542. Within the cylindrical portion 540 of adjustable collar 538 is a bore 544 of a first diameter and within the threaded portion 542 is a further bore 546 smaller in diameter than bore 544. A transition between bores 544 and 546 provides a stop against which the end of the jacket 524 of the cable 522 is positioned. Placed about adjustable collar 538 is a sleeve 548 internally threaded as at 550.

To use the connector 500 the cable is prepared by removing the jacket 524 from a portion of the cable 522 to expose the fiber 526. The cable 522 is fed through aperture 530 of seal 532 into bore 544 of adjustable collar 538 until the jacket 524 engages the transition between bores 544, 546. The fiber 526 is now extending through and beyond the sleeve 548. At this time the cylindrical portion 540 of adjustable collar 538 is crimped about the cable 522 jacket 524 to provide strain relief for the cable 522. Sleeve 548 is now positioned about the portion 542 causing the threads 550 of sleeve 548 to be engaged by threaded portion 542. The subassembly 528 is now positioned in an appropriate tool and sleeve 548 adjusted until the fiber 526 extends to a desired position. Sleeve 548 is now crimped to retain fiber 526 in its desired position. Subassembly 528 is now placed into bore 512 of housing 504 so that the sleeve 548 butts up against wall 518. The final configuration of the crimped sleeve 548 is such that there will be an interference fit between the sleeve 548 and bore 512. The fiber 526 will extend through tapered bore 518 into the interspace between rods 386, 388 and 390. The seal 532 is now threadably fastened in position. The installation of a subassembly as 352 completes the assembly.

While there have been shown and described and pointed out the fundamental novel features of the invention as applied to the preferred embodiments, it will be understood that various omissions and substitutions and changes of the form and details of the devices illustrated and in their operation may be made by those skilled in the art, without departing from the spirit of the invention.

The embodiments of the invention in which an exclusive property or privilege is claimed are defined as follows:

1. A connector for coupling first and second optical fibers in alignment along an axis, comprising:
   (a) first support means for receiving said first fiber and disposing an end thereof in fixed position;
   (b) second support means for receiving said second fiber and disposing an end thereof in fixed position;
   (c) transfer means disposed between said first and second support means in supporting relation to one of said fiber ends and slidable along the axis of such alignment relative to at least one of said first and second support means into supporting registration with both such fiber ends.

2. The connector claimed in claim 1 further including coupling means for assembly with said first and second support means to secure the positional relationship of said first and second support means and said transfer means along said alignment axis.

3. The connector claimed in claim 1 wherein said transfer means comprises first and second plate means respectively slidable in said first and second support means.

4. The connector claimed in claim 3 including resilient means for biasing said first and second plate means into respective preselected positions relative to said first and second support means.

5. A connector claimed in claim 4 including coupling means for engagement with said first plate means for fixedly positioning the same relative to said first optical fiber upon receipt of said first support means by said coupling means, said coupling means engagingly displacing said second plate means relative to said second optical fiber upon receipt of said second support means by said coupling means, said first plate means thereby being movable into supporting registration with both said fiber ends.

6. The connector claimed in claim 1 wherein said first and second support means include fiber support grooves and clamp means for securement of fibers in said grooves, said transfer means also including fiber support grooves, said connector further including coupling means for securing the positional relationship of said first and second support members and said transfer means, said coupling means including further clamp means for securement of said fiber ends in such transfer means grooves.

7. A connector for coupling ends of first and second optical fibers in alignment along an axis, comprising first grooved means fixedly supporting said first optical fiber and second grooved means fixedly supporting said second optical fiber, a portion of said first grooved means being slidable along such alignment axis, relative to both the remainder of said first grooved means and said first optical fiber into supporting registration with ends of both said first and second optical fibers, in the course of movement of said first and second grooved means into coupled relation along said alignment axis.

* * * * *